Feb. 10, 1931. C. M. RICHARDSON ET AL 1,792,322
METHOD FOR MAKING RUBBER FOOTWEAR
Original Filed May 3, 1927    2 Sheets-Sheet 2
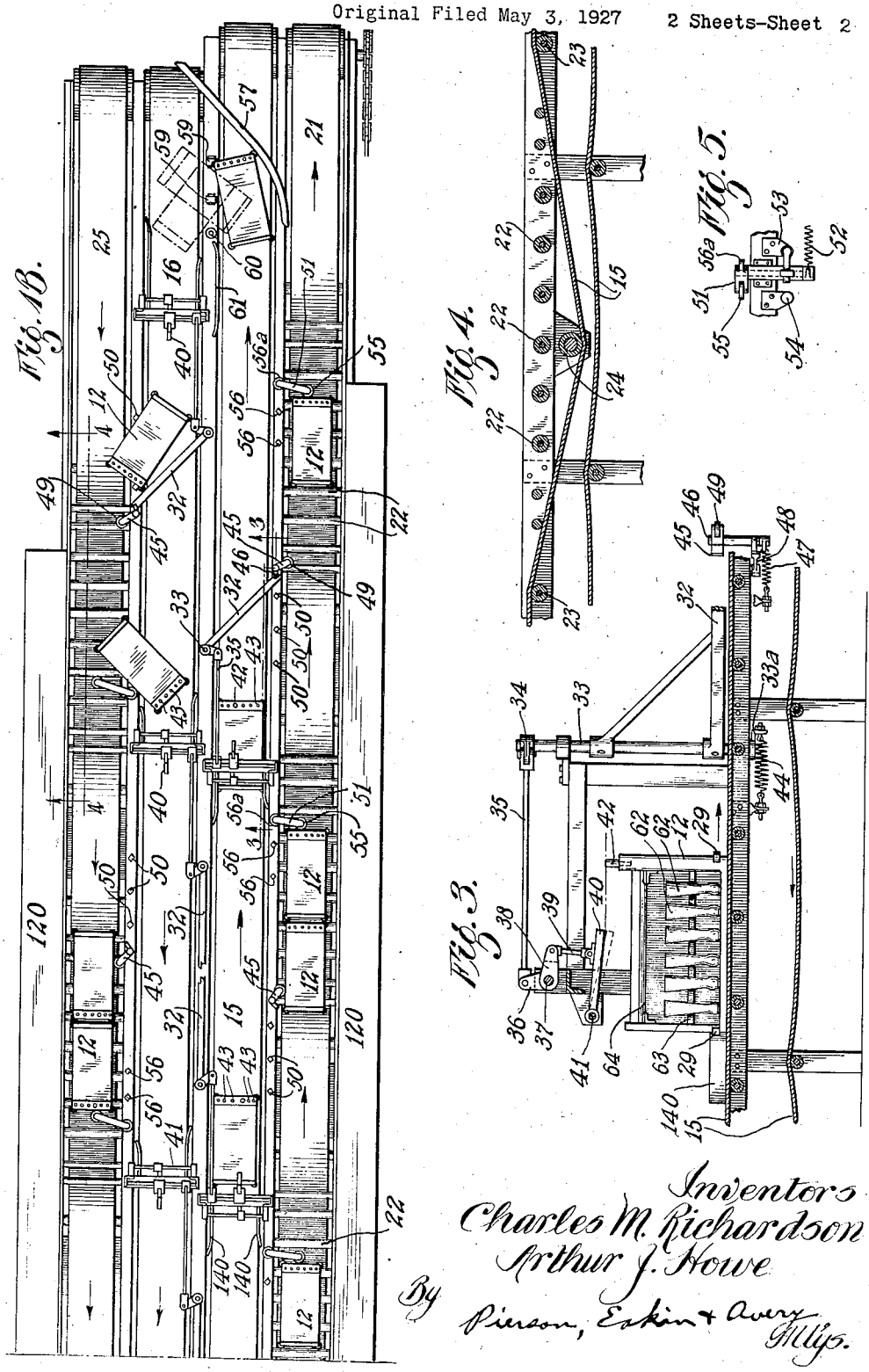
Inventors
Charles M. Richardson
Arthur J. Howe
By Pierson, Eakin & Avery
Attys.

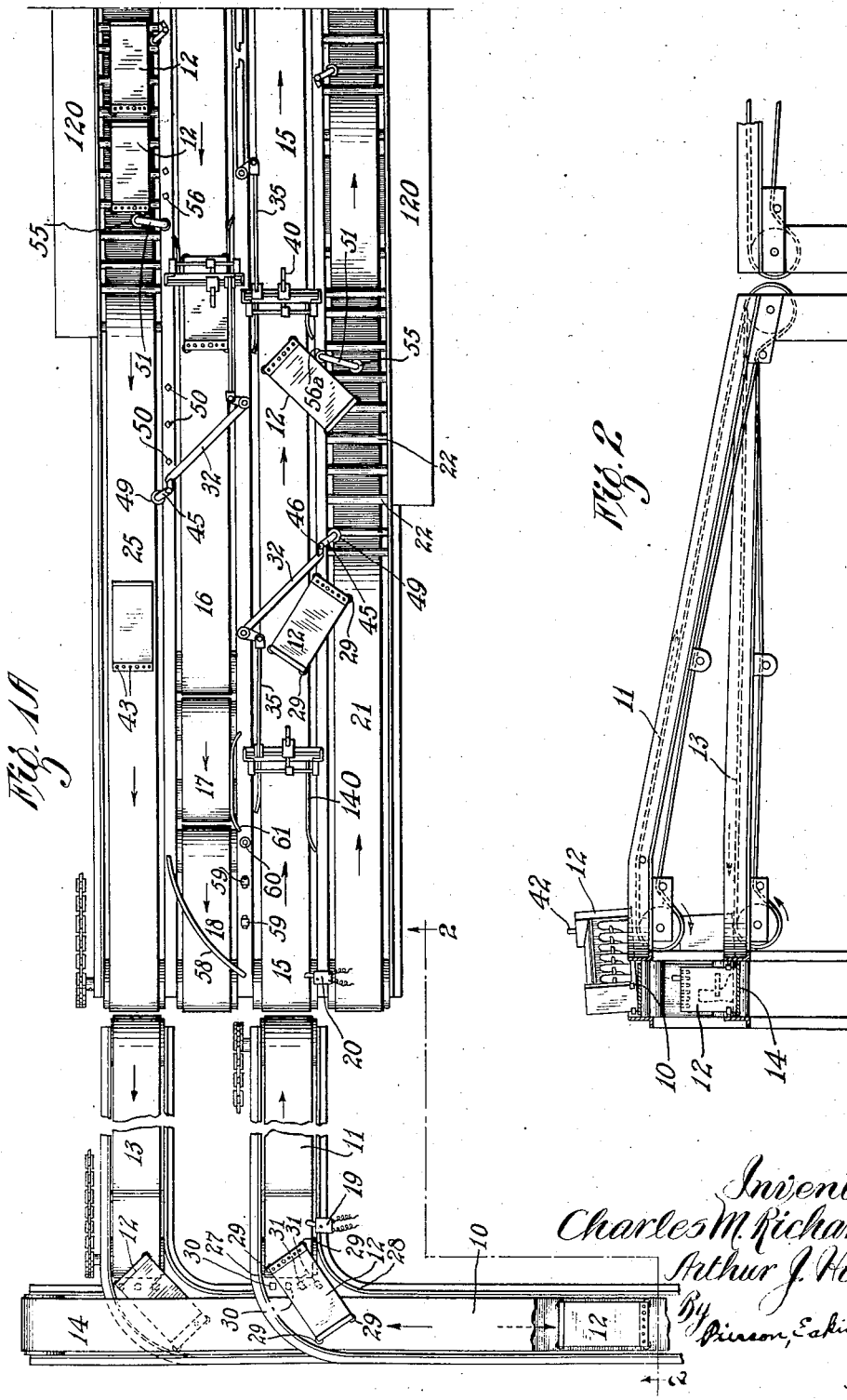

Patented Feb. 10, 1931

1,792,322

UNITED STATES PATENT OFFICE

CHARLES M. RICHARDSON, OF AKRON, AND ARTHUR J. HOWE, OF CUYAHOGA FALLS, OHIO, ASSIGNORS TO THE B. F. GOODRICH COMPANY, OF NEW YORK, N. Y., A CORPORATION OF NEW YORK

METHOD FOR MAKING RUBBER FOOTWEAR

Original application filed May 3, 1927, Serial No. 188,502. Divided and this application filed February 1, 1928. Serial No. 251,170.

This invention relates to methods for making rubber products, and especially rubber footwear, in the manufacture of which a large number of tacky rubber or rubberized parts are assembled in each article produced and a large number of different types and different sizes of the article are produced in the same workroom. The present application is a division of our application Serial No. 188,502, filed May 3, 1927.

In the manufacture of rubber overshoes the number of different stock units of the same kind of cloth, difficult to distinguish from each other at sight, runs into hundreds and even into thousands in the larger rubber footwear factories and heretofore much time has been lost and much stock has been wasted because of the difficulty of keeping the workers at their benches supplied with the necessary kinds of stock pieces without confusion.

Our chief objects are to provide an improved method whereby these difficulties may be overcome; to provide economy of labor; to avoid waste of material; to facilitate inspection of the work as successive pieces of the stock are built into the product; to reduce the necessary exertion of the workers; to obtain an improved and more uniform product; to avoid confusion of product and of materials; to provide economy of power and of floor space; and to avoid numerous inconveniences.

Of the accompanying drawings:

Fig. 1—A and Fig. 1—B together constitute a plan view of apparatus embodying and adapted to carry out our invention in its preferred form.

Fig. 2 is a vertical section on line 2—2 of Fig. 1—A.

Fig. 3 is a vertical section on line 3—3 of Fig. 1—B.

Fig. 4 is a vertical section on line 4—4 of Fig. 1—B.

Fig. 5 is an elevation of stop mechanism constituting a part of the apparatus.

In the practice of our invention in its preferred form as applied to the manufacture of rubber footwear, a group of lasts and the stock pieces required for building all or nearly all of the overshoe are placed upon a conveyance such as a work tray or "car," especially designed to hold the lasts and the work pieces in convenient relation for the selection of work pieces and their application to the lasts, and a plurality of such cars with the lasts and work pieces thereon are circulated by means of a system of conveyors past a series of work stations at each of which one or more operations are performed.

Provision is made for automatically deflecting cars which are ready for a given operation into a work station where that operation is performed and where a full quota of cars is not already on hand, and for continuing the circulation of such a car past stations devoted to such operation in case the station is already filled with cars, the car continuing to be circulated until it reaches such a station having space for receiving it.

The cars and conveyors are so constructed and arranged that when a given operation has been completed with respect to a car the operator may arrange the switching device on the car so that when it is placed back on the circulating conveyor system it will automatically be diverted into the first encountered working station devoted to the next succeeding operation and having less than its full quota of cars on hand.

Referring to the drawings, the apparatus as here shown comprises supply conveyors 10 and 11 (Fig. 1) of the conveyor belt type adapted to deliver to the circulating conveyor system successive trays or cars 12, 12 carrying the lasts and the work pieces, and delivery conveyors 13, 14 of the conveyor belt type adapted to receive the cars from the circulating conveyor system and carry them away for subsequent operations such as the vulcanization of the overshoes.

The circulating conveyor system comprises an endless belt conveyor 15 adapted to receive the cars from the conveyor 11 (Fig. 1—A) and, at its delivery end (Fig. 1—B), to pass the cars laterally onto an endless belt conveyor 16 driven in the opposite direction and adapted to deliver the cars onto a short endless belt conveyor 17 (Fig. 1—A) which in turn is adapted to deliver them onto a short endless belt conveyor 18 having provision for passing the cars laterally therefrom back onto the conveyor 15 adjacent the end thereof at which the cars are initially received.

Provision is made for continuously driving the conveyors 15, 16 and 18 at the same speed and a separate electric circuit including a stop switch 19 and a starting switch 20 is provided for driving the short conveyor 17. The stop switch 19 is mounted near the upper or receiving end of the conveyor 11 in position to be actuated by contact of a car 12 passing that position, to stop the drive of the short conveyor 17 and thus delay any car that may be upon the conveyor 17 and prevent it from colliding at the receiving end of the conveyor 15 with the car which actuates the switch 19. The conveyor 11 is of such length that any car already upon the conveyor 18 at the time the switch 19 is actuated will have time to pass onto the conveyor 15 before the switch-actuating car arrives at the transfer position. The starting switch 20 is mounted over the receiving end of the conveyor 15 in such position that a car actuating it to start the conveyor 17 will pass forward from the receiving end of the conveyor 15 a sufficient distance to permit the car from the conveyor 17 to be received behind it.

Mounted at the outer side of the conveyor 15 and extending along the same is an endless belt conveyor 21 having its upper reach guided under successive series of loosely journaled rolls such as the rolls 22, 22, by guide rolls such as the rolls 23, 24, 23 (Fig. 4), each set of rolls 22 constituting a work station. Along the work station is mounted a workbench 120.

A similar construction including an endless belt conveyor 25 is mounted at the outer side of the conveyor 16, providing working stations along the latter, and the conveyor 25 is adapted to deliver the cars with the finished work thereon to the delivering conveyor 13.

The upper reach of the conveyor 15 and the conveying reaches of the conveyor 21 are preferably level with each other and the two conveyors are preferably driven at the same speed. The same arrangement is preferred with respect to the conveyors 16 and 25, and the upper reaches of the conveyors 15 and 16 also are preferably level with each other.

For transferring the cars from one conveyor to another at the same level, diverting devices are provided constituting the subject matter of a copending application of the undersigned Arthur J. Howe, Serial No. 188,515, filed May 3, 1927.

For transferring the cars from the supply conveyor 10 to the supply conveyor 11 (Fig. 1—A) outer and inner guide-rails 27, 28, curved at the turn, are mounted just over the two conveyor belts and adapted to coact with projecting guide-rollers 29, 29 mounted, on vertical axes, on the corners of the car, and supporting and guiding rollers 30, 30 are journaled on horizontal axes between the conveyor belt 10 and the conveyor belt 11 with their tops slightly higher than the adjacent portions of the conveyor belts and with their axes parallel with the belt 10, so that when the front end of the car is diverted by the guide-rail 27 into contact with one or more of them the front end of the car will be slightly lifted in riding up over the roller or rollers, the rear end of the car remaining in driving contact with the belt 10 until the car overbalances upon the rollers 30 and thus brings its front end into driving contact with the belt 11, which then draws the car forward onto itself from the rollers 30, the rear end of the car, being raised out of contact of the belt 10, being free to swing about the turn to bring the car into proper alignment upon the belt 11.

For so swinging the rear end of the car without sliding contact of the side of the car against the inner guide-rail 28, rollers 31, 31 are journaled adjacent the rollers 30, nearer the inside of the turn, with their tops at the same height as those of the rollers 30, the rollers 31 being mounted with their axes substantially radial with respect to the turn, at about 45° to the conveyors 10 and 11.

For diverting the cars from the conveyor 15 to the conveyor 21 or from the conveyor 16 onto the conveyor 25, to pass the car into a work station, a deflector arm 32 (see Figs. 1—B and 3), just clearing the upper reach of the first conveyor, 15 or 16, is secured upon a vertical shaft 33 journaled in the framing at the back side of the conveyor and having secured on its upper end an arm 34 connected by a link 35 with an arm 36 rising from a horizontal rock-shaft 37 journaled in the framing and disposed transversely over the conveyor. The rock-shaft 37 has a horizontal arm 38 secured thereon at a position longitudinally thereof determined according to whether one or another type of operation is to be performed upon the work carried by the car which is to be diverted by the arm 32 into the particular work station. The outer end of the arm 38 is connected by a link 39 with a cam arm 40 which is pivoted at 41 in the framing and is adapted to be lifted, to swing the arm 32 into diverting position, by a pin 42 mounted in one of a series of holes 43, 43 provided in the top of the frame of the car, the pin being adapted to be mounted in one or another of the holes 43 according to whether it is desired to have the car diverted into one or another of the work stations, the positions of the holes 43 corresponding respectively with the positions of the cam arms 40 at the several work stations. Guide-rails 140, 140 are provided at the respective sides of the conveyor to assure alignment of the car for proper alignment and coaction of the pin 42 with the arm 40.

For urging the diverting arm 32 toward its inoperative position at the side of the conveyor over which it swings, an arm 33ª is secured upon the lower end of the vertical shaft 33 below the framing and is connected with a part of the framing by a pull-spring 44, the spring being adapted to be overcome by the force of the cam arm 40 in swinging the diverting arm 32 to diverting position.

For latching the arm 32 in diverting position to hold it there until the pin 42 has passed from the cam lever and until the car has been diverted onto the adjacent conveyor, 21 or 25, and for then releasing the arm 32 to permit it to be returned by the spring 44 to inoperative position, a bell-crank latch 45 is pivoted on a vertical axis 46 between the two conveyors and is urged by a spring 47 to a position against a stop 48 such that the outer end of the arm 32 in swinging to diverting position will turn the latch about the pivot 46 against the force of the spring 47 and automatically latch upon the adjacent arm of the latch, as shown in Fig. 1—B. The other arm of the latch extends over the conveyor to which the car is diverted and is provided with a roller 49 adapted to be engaged by the side of the car after the car obtains adequate driving contact with the second conveyor, to turn the latch 45 to release the diverting arm 32 and permit the latter to return to inoperative position, for the passage of such cars as are not destined for the particular work station.

The roller 49 also is adapted to remain in engagement with a car standing in the work station, to hold the latch 45 in inoperative position, so that succeeding cars, although having pins 42 so set as to actuate the cam lever 40 and diverting arm 32, will be rejected by the work station, the arm 32 swinging to diverting position but immediately returning to inoperative position when the pin 42 passes the cam arm 40, without diverting the car. Each work station is preferably of such length as to hold a plurality of cars, each station here shown being adapted to accommodate two of the cars, and the construction is such that cars will be rejected by the station only when the station is full.

To facilitate the transfer of the cars from the conveyor 15 to the work station of the conveyor 21 or from the conveyor 16 to the work station of the conveyor 25, a set of rollers 50, 50 are mounted between the two conveyors with their tops slightly above the level of the latter and with their axes so disposed that the peripheral movement of their tops will be in a direction diverging from the diverting face of the arm 32 at a slight angle, such as an angle of 3 to 5 degrees, so that as soon as the leading end of the car has been diverted by the deflector arm 32 into contact with one or more of the rollers and has been caused to ride thereon the roller or rollers will cause the front end of the car to move laterally more rapidly than it would be deflected by the arm 32, so that the car moves out of contact with the arm 32 and avoids frictional wear, with consequent reduction of strain and power consumption, the car continuing to be driven over the rollers 50 by contact of its rear end upon the conveyor from which it is being diverted. As soon as the car over-balances on the rollers 50 and thus obtains driving contact on its leading end with the conveyor to which it is being diverted the rear end of the car, rising out of contact with the first conveyor, is swung over into alignment upon the second conveyor by the angularly-positioned supporting and diverting rollers 50, the general result of the operation being that the car is transferred from one conveyor to the other with very little sliding contact with the diverting arm 32 or with the rollers 50 or with either of the conveyors.

For stopping the foremost car in the work station upon the idler rolls 22 a stop arm 51 is pivoted upon the frame structure between the two conveyors and is yieldingly urged toward stopping position by a hub-spring 52, a stop 53 being provided holding the arm in position to stop the car and a stop 54 being provided to prevent the arm from being swung over the adjacent circulating conveyor. The arm 51 is adapted to be swung against the stop 54 by hand to permit the car 12 to be shoved past it on occasion, for conveyance of the car upon the work station conveyor to the next work station. The outer end of the arm is provided with an antifrictional roller 55 which is adapted to run on the side of the car after the leading end of the car has passed it, so that the stop arm will be held out of stopping position until the car is past and then will be swung back to stopping position by the spring 52.

For facilitating the transfer of a car from the work station back to the circulating conveyor, guide and supporting rollers 56, 56 (Fig. 1—B) are mounted on the frame between the work station and the circulating conveyor with their axes at an angle of about 45° to the conveyor and with their tops slightly above the conveyors, so that when the car is shifted onto them by hand they will function in substantially the same manner as the rollers 50, 50 above described, to swing the rear end of the car onto the circulating conveyor as the car is drawn forward upon the latter by the contact of the front end of the car with the circulating conveyor. A roller 56ª mounted in the hub of the stop-arm 51 is provided for assisting the rollers 56 in aligning the car upon the circulating conveyor.

For transferring cars from the conveyor 15 onto conveyor 16, as shown at the right-hand end of Fig. 1—B, or from the conveyor 18 onto the conveyor 15, as shown near the left-hand end of Fig. 1—A, a curved deflector 57 or 58 is fixedly mounted just over the conveyor from which the car is to be transferred and a pair of rolls 59, 59 are mounted between the two conveyors, on a common horizontal axis parallel with the conveyors, with their tops slightly above the level of the conveyors, so that as the front end of the car rides upon them the car will continue to be driven by contact of its rear end with the first conveyor until it over-balances on the rolls, whereupon, its rear end lifting from the first conveyor, it will be turned about and driven in the opposite direction upon the second conveyor by the contact of its front end with the second conveyor, the position of the rollers being such as to cause its rear end then to be swung over into alignment on the second conveyor.

A roller 60 journaled upon a vertical axis, or similar guide means, may be mounted at the inside of the turn to supplement the aligning action of the rollers 59 if necessary, and a guide-rail 61 may be mounted at the inside of the turn, adjacent the roller 60, to assure proper alignment of the car as it approaches the turn.

Each car consists of a box with its front side open for access to a group of lasts 62, 62 (Fig. 3) standing upon its floor, and for holding the lasts in order and in upright position a bracket or bridge piece 63 is mounted in the box in horizontal position at about half the height of the lasts and is formed with a series of notches in its front edge each adapted to receive the shank portion of a last to give it lateral support.

Near its top the box is provided with a horizontal shelf 64 adapted to support the supply of stock pieces appropriate to be assembled upon the lasts of the group, the stock pieces preferably being stacked in liners in such order that in the successive operations the top ones will be used first and the bottom ones last.

In the use of this apparatus for the practice of our invention the successive cars, each with its set of lasts and stock pieces properly assembled thereon, and with its pin 42 properly set to divert the car into a work station where the first building operation is being performed, are received from the conveyor 10 onto the conveyor 11 and from the latter onto the conveyor 15.

At the first such work station reached by the car the car is automatically diverted into the station by the mechanism including the diverting arm 32, unless the station already contains its full quota of cars, in which case the car last received in the station, by holding the latch 45 in inoperative position as above described, permits the diverting arm 32, swung to diverting position by the car's pin 42 and the cam arm 40, to be swung back to inoperative position by the spring 44 before the car reaches it, so that the car proceeds upon the conveyor 15, and possibly makes the circuit of the conveyors 15, 16, 17, and 18 repeatedly, until it finds a first-operation work station having room for it, whereupon it is automatically diverted into such station.

There the operator removes the lasts 62 from the car to the work bench 120 and performs the first operation upon them, taking stock pieces from the car and returning each last to the car as the operation is completed, and resets the pin 42 for diversion of the car into a station at which the second operation is being performed.

The operator then shoves the car into an over-balanced position upon the rollers 56 so that the conveyor 15 receives the car's forward end and draws it forward, the rollers 56, because of their angular position causing its rear end to swing over into alignment upon the conveyor, as it is drawn around the roller $56^a$.

The car then proceeds as before for the second and additional operations upon the work, and when the last of the operations has been completed with respect to a car, the pin is set for diversion of the car from the conveyor 16 onto the conveyor 25 by the last diverting arm 32 on the conveyor 16 (Fig. 1—A), beyond the last work station of the conveyor 25, the diverting arm then being unlatched by contact of the car with the adjacent latch-roller 49, and the car is carried away to the vulcanizers, for example, by the conveyors 25, 13 and 14.

In the circulation of cars seeking an open station collision of such cars with cars coming in from the conveyor 11 is prevented by stoppage of the conveyor 17, through actuation of the stop switch 19 by a car passing the same, the conveyor 17 remaining stopped until the incoming car actuates the starting switch 20, so that no car leaves the conveyor 17 while an incoming car is on the in-feed conveyor 11.

Our invention results in much saving of time, labor and stock, in orderliness of procedure and avoidance of confusion, economy of floor space and of power consumption, and in the other advantages expressed and implied in the above statement of objects.

Many modifications are possible within the scope of the appended claims.

We claim:

1. The method of making articles of rubberized fibrous material which comprises collecting in each of successive groups a plurality of separate stock pieces adapted to constitute parts of one of the articles, conveying the groups in succession through a series of work stations and performing successive assembling operations upon the work at successive work stations, groups of the stock pieces being carried past fully occupied work stations in an endless circuit until they are received at a work station not fully occupied, and diverting groups from the endless circuit when they have been subjected to all of the successive operations.

2. The method of making articles of rubberized fibrous material which comprises collecting in each of successive, isolated groups a plurality of separate stock pieces adapted to constitute parts of one of the articles, conveying the groups in succession through a series of work stations and performing successive assembling operations upon the work at successive work stations.

3. The method of making rubber shoes which comprises collecting in each of successive groups a plurality of lasts and a substantially complete set of stock pieces adapted for the building of shoes upon the lasts of the group, conveying the groups in succession through a series of work stations and performing successive assembling operations upon the work at successive work stations, the lasts of the group being held in orderly arrangement as they are received at the station and returned to such arrangement before they leave the station, groups of the lasts and stock pieces being carried past fully occupied work stations in an endless circuit until they are received at a work station not fully occupied, and diverting groups from the endless circuit when they have been subjected to all of the successive operations.

4. The method of making rubber shoes which comprises collecting in each of successive groups a plurality of lasts and a substantially complete set of stock pieces adapted for the building of shoes upon the lasts of the group, conveying the groups in succession through a series of work stations and performing successive assembling operations upon the work at successive work stations, the lasts of the group being held in orderly arrangement as they are received at the station and returned to such arrangement before they leave the station.

In witness whereof we have hereunto set our hands this 27th day of January, 1928.

CHARLES M. RICHARDSON.
ARTHUR J. HOWE.